US011500395B2

(12) United States Patent
Tam

(10) Patent No.: US 11,500,395 B2
(45) Date of Patent: Nov. 15, 2022

(54) FLIGHT PATH CONTROL BASED ON CELL BROADCAST MESSAGES

(71) Applicant: Telefonaktiebolaget LM Ericsson (publ), Stockholm (SE)

(72) Inventor: Kwan To Tam, Hong Kong (CN)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 421 days.

(21) Appl. No.: 16/091,466

(22) PCT Filed: Apr. 11, 2016

(86) PCT No.: PCT/CN2016/078955
§ 371 (c)(1),
(2) Date: Oct. 4, 2018

(87) PCT Pub. No.: WO2017/177361
PCT Pub. Date: Oct. 19, 2017

(65) Prior Publication Data
US 2019/0155312 A1    May 23, 2019

(51) Int. Cl.
*G05D 1/10* (2006.01)
*H04W 4/021* (2018.01)
(Continued)

(52) U.S. Cl.
CPC .......... *G05D 1/101* (2013.01); *B64C 39/024* (2013.01); *G05D 1/00* (2013.01); *G05D 1/0022* (2013.01);
(Continued)

(58) Field of Classification Search
CPC ...... G05D 1/101; H04W 4/024; H04W 4/021; H04W 4/06; H04W 4/44; H04W 4/029;
(Continued)

(56) References Cited

U.S. PATENT DOCUMENTS 1,379,522 A * 5/1921 Garland ................ B64C 23/005
244/17.19
4,891,650 A * 1/1990 Sheffer ................. B60R 25/102
340/990
(Continued)

FOREIGN PATENT DOCUMENTS

CN    1929335 A    3/2007
CN    101341770 A    1/2009
(Continued)

OTHER PUBLICATIONS

U.S. Appl. No. 62/259,163, filed Nov. 2015, Ziemba, Linda.*
(Continued)

*Primary Examiner* — Richard A Goldman
(74) *Attorney, Agent, or Firm* — Rothwell, Figg, Ernst & Manbeck, P.C.

(57) ABSTRACT

A node (121-123) of a wireless communications network (120) and an aerial vehicle (110), such as an Unmanned Aerial Vehicle (UAV), a drone, an aircraft, or a helicopter, comprising a communications module (111) are provided. The node is operative, in response to detecting that the aerial vehicle enters a pre-defined geographical region (221-227) within a coverage area of the wireless communications network, to transmit a cell broadcast message (126; 201-204) to the aerial vehicle. The aerial vehicle is operative to receive the cell broadcast message from an access node (121) of the wireless communications network, and, in response thereto, correct its flight path (211-214) based on the received cell broadcast message. Preferably, the cell broadcast message comprises at least one, or a combination, of an instruction, a limitation, a restriction, a direction or a change thereof, a bearing or a change thereof, an altitude or a change thereof, an aerial vehicle type, and an aerial vehicle identity.

20 Claims, 4 Drawing Sheets

(51) Int. Cl.

| | |
|---|---|
| *H04W 4/06* | (2009.01) |
| *B64C 39/02* | (2006.01) |
| *H04W 4/024* | (2018.01) |
| *G08G 5/00* | (2006.01) |
| *G05D 1/00* | (2006.01) |
| *H04B 7/185* | (2006.01) |
| *H04W 4/44* | (2018.01) |
| *H04W 4/02* | (2018.01) |
| *H04W 4/029* | (2018.01) |

(52) U.S. Cl.
CPC ......... *G08G 5/0013* (2013.01); *G08G 5/0039* (2013.01); *G08G 5/0043* (2013.01); *G08G 5/0069* (2013.01); *H04B 7/18506* (2013.01); *H04W 4/021* (2013.01); *H04W 4/024* (2018.02); *H04W 4/06* (2013.01); *B64C 2201/126* (2013.01); *B64C 2201/146* (2013.01); *H04W 4/026* (2013.01); *H04W 4/029* (2018.02); *H04W 4/44* (2018.02)

(58) Field of Classification Search
CPC ................. H04W 4/026; B64C 39/024; B64C 2201/126; B64C 2201/146; B64C 2201/141; B05D 1/00; B05D 1/0022; G08G 5/0013; G08G 5/0039; G08G 5/0043; G08G 5/0069; G08G 5/091; G08G 5/003; G08G 5/006; H04B 7/18506
USPC ...................................... 701/2, 301; 340/907
See application file for complete search history.

(56) References Cited

U.S. PATENT DOCUMENTS

| | | | | |
|---|---|---|---|---|
| 5,705,996 | A * | 1/1998 | Eguchi ................. | G07B 15/063 340/928 |
| 6,476,517 | B1 * | 11/2002 | Okada ................... | B60R 25/245 307/10.1 |
| 9,087,451 | B1 * | 7/2015 | Jarrell .................. | G08G 5/0091 |
| 10,101,741 | B2 * | 10/2018 | Okada ................... | G08G 5/0013 |
| 10,249,158 | B1 * | 4/2019 | Jordan, II .......... | H04N 5/23206 |
| 10,310,498 | B2 * | 6/2019 | Petruzzelli .......... | G05D 1/0011 |
| 10,534,956 | B1 * | 1/2020 | Trelin ............ | G06Q 10/063114 |
| 11,218,267 | B2 * | 1/2022 | Zhang .................... | H04B 7/088 |
| 2004/0249571 | A1 * | 12/2004 | Blesener ................ | B61L 29/28 701/301 |
| 2005/0090972 | A1 | 4/2005 | Bodin et al. | |
| 2008/0299965 | A1 | 12/2008 | Lagerman | |
| 2009/0132100 | A1 | 5/2009 | Shibata | |
| 2009/0171547 | A1 * | 7/2009 | Hyde ..................... | F02D 41/021 701/102 |
| 2014/0032034 | A1 | 1/2014 | Raptopoulos et al. | |
| 2014/0142787 | A1 | 5/2014 | Tillotson et al. | |
| 2014/0172194 | A1 | 6/2014 | Levien et al. | |
| 2014/0303884 | A1 | 10/2014 | Levien et al. | |
| 2015/0254988 | A1 * | 9/2015 | Wang .................... | B64D 47/08 701/3 |
| 2015/0336667 | A1 | 11/2015 | Srivastava et al. | |
| 2016/0117929 | A1 * | 4/2016 | Chan ..................... | G06Q 30/04 701/3 |
| 2016/0203651 | A1 * | 7/2016 | Heath ..................... | H04W 4/40 705/13 |
| 2016/0212601 | A1 * | 7/2016 | Braun ................. | H04W 72/042 |
| 2016/0275801 | A1 * | 9/2016 | Kopardekar ......... | G08G 5/0069 |
| 2016/0373966 | A1 * | 12/2016 | Bergqvist ............. | H04W 24/08 |
| 2016/0381510 | A1 * | 12/2016 | Reynolds ............. | H04B 17/318 455/456.1 |
| 2017/0064259 | A1 * | 3/2017 | Bostick ................ | G06K 9/0063 |
| 2017/0147975 | A1 * | 5/2017 | Natarajan ............ | G05D 1/0676 |
| 2017/0171836 | A1 * | 6/2017 | Gupta .................... | H04W 4/06 |
| 2017/0234724 | A1 * | 8/2017 | Naguib .................. | G01H 3/08 367/117 |
| 2017/0234966 | A1 * | 8/2017 | Naguib .................. | G01S 5/22 367/117 |
| 2017/0287341 | A1 * | 10/2017 | Jarrell .................. | G08G 5/0091 |
| 2017/0364065 | A1 * | 12/2017 | Petruzzelli ............... | H04B 1/06 |
| 2017/0372617 | A1 * | 12/2017 | Bruno .................... | G08G 5/025 |
| 2018/0061249 | A1 * | 3/2018 | Cui ....................... | G08G 5/0013 |
| 2018/0176742 | A1 * | 6/2018 | Narayanan ....... | G08G 1/096775 |
| 2018/0220352 | A1 * | 8/2018 | Hudson .............. | H04B 7/18506 |
| 2018/0255444 | A1 * | 9/2018 | Chae .................. | H04L 25/03866 |
| 2019/0155312 | A1 * | 5/2019 | Tam ................... | H04B 7/18506 |
| 2019/0310622 | A1 * | 10/2019 | Li ........................ | G08G 5/0013 |
| 2019/0387430 | A1 * | 12/2019 | Ingerman .............. | H04L 41/082 |
| 2020/0260223 | A1 * | 8/2020 | Reyes .................. | H04W 4/025 |
| 2020/0279485 | A1 * | 9/2020 | Zhang .................. | G07F 17/246 |

FOREIGN PATENT DOCUMENTS

| | | |
|---|---|---|
| CN | 103676957 A | 3/2014 |
| CN | 204316545 U | 5/2015 |
| CN | 104797995 A | 7/2015 |
| CN | 105187384 A | 12/2015 |
| CN | 105278362 A | 1/2016 |
| CN | 105373132 A | 3/2016 |

OTHER PUBLICATIONS

International Search Report and Written Opinion dated Jan. 18, 2017 issued in International Application No. PCT/CN2016/078955. (8 pages).

Sineglazov et al., "Navigation Systems Based on Global System for Mobile Communications", National Aviation University UDC 511. 512 (045), pp. 103-111 (2014).

Layh et al., "GPS-Denied Navigator for Small UAVs: Final Report", University of Minnesota UAV Laboratory; Department of Aerospace Engineering & Mechanics, 35 pages (Oct. 8, 2014).

\* cited by examiner

US 11,500,395 B2

FLIGHT PATH CONTROL BASED ON CELL BROADCAST MESSAGES

CROSS REFERENCE TO RELATED APPLICATION(S)

This application is a 35 U.S.C. § 371 National Stage of International Patent Application No. PCT/CN2016/078955, filed Apr. 11, 2016, designating the United States.

TECHNICAL FIELD

The invention relates to an aerial vehicle comprising a communications module for communicating with a wireless communications network, a node of a wireless communications network, corresponding methods, corresponding computer programs, and corresponding computer program products.

BACKGROUND

Unmanned Aerial Vehicles (UAVs) have become increasingly popular in recent years, in particular for surveillance, drone photography, ground monitoring, spraying pesticides, emergency or rescue operations, and the like.

The known technology governing autonomous navigation of UAVs today includes flight programs utilizing a map, oftentimes complemented by positioning based on the Global Positioning System (GPS) (see, e.g., US 2005/0090972 A1). Also known is the use of ground stations for positioning, or improving the accuracy of positioning data (see, e.g., US 2014/0032034 A1; "GPS-Denied Navigator for Small UAVs", by T. Layh et al., Final Report, University of Minnesota UAV Laboratory, Department of Aerospace Engineering & Mechanics, Oct. 8, 2014; and "Navigation systems based on Global System for Mobile Communications", by V. M. Sineglazov and S. S. Shildskyi, National Aviation University, Ukraine, 2014).

There is no known solution to enforce any (compliant) UAV to follow a certain flight path, e.g., in the case of emergency or other situations which demand all UAVs, or a selected group/type of UAVs, within a specific region to obey a certain flight path or at least restrictions of the flight path. One example of such a use case is a forest fire, requiring all in-flight UAVs to reroute in order to avoid flying directly into the fire or being affected by the turbulent air current surrounding the fire. Another example is to reroute all medical drones to a site where people are in need of medical attention due to an accident. Yet another example is to build low cost drones which fly over a certain area without having to rely on GPS positioning and complex flight path computers.

SUMMARY

It is an object of the invention to provide an improved alternative to the above techniques and prior art.

More specifically, it is an object of the invention to provide an improved solution for controlling the flight path of aerial vehicles, such as UAVs, drones, aircrafts, and helicopters, by utilizing existing infrastructure of wireless communications networks, e.g., cellular communications networks like Global System for Mobile Communications (GSM) networks, Universal Mobile Telecommunications System (UMTS) networks, and Long Term Evolution (LTE) networks, or WiFi networks, also known as Wireless Local Area Networks (WLAN).

These and other objects of the invention are achieved by means of different aspects of the invention, as defined by the independent claims. Embodiments of the invention are characterized by the dependent claims.

According to a first aspect of the invention, an aerial vehicle is provided. The aerial vehicle comprises a communications module for communicating with a wireless communications network. The aerial vehicle is operative to receive a cell broadcast message from an access node of the wireless communications network, and to correct the flight path of the aerial vehicle in response thereto. The flight path of the aerial vehicle is corrected based on the received cell broadcast message.

According to a second aspect of the invention, a node of a wireless communications network is provided. The node is operative to transmit a cell broadcast message to an aerial vehicle in response to detecting that the aerial vehicle enters a pre-defined geographical region. The pre-defined geographical region is within a coverage area of the wireless communications network.

According to a third aspect of the invention, a method of an aerial vehicle is provided. The aerial vehicle comprises a communications module for communicating with a wireless communications network. The method comprises receiving a cell broadcast message from an access node of the wireless communications network, and correcting the flight path of the aerial vehicle in response thereto. The flight path is corrected based on the received cell broadcast message.

According to a fourth aspect of the invention, a method of a node of a wireless communications network is provided. The method comprises transmitting a cell broadcast message to an aerial vehicle in response to detecting that the aerial vehicle enters a pre-defined geographical region. The pre-defined geographical region is within a coverage area of the wireless communications network.

According to a fifth aspect of the invention, a computer program is provided. The computer program comprises computer-executable instructions for causing a device to perform the method according to an embodiment of the third or fourth aspect of the invention, when the computer-executable instructions are executed on a processing unit comprised in the device.

According to a sixth aspect of the invention, a computer program product is provided. The computer program product comprises a computer-readable storage medium which has the computer program according to the fifth aspect of the invention embodied therein.

The invention makes use of an understanding that infrastructure of conventional wireless communications networks may be utilized for controlling the flight path of UAVs, and other manned or unmanned aerial vehicles, in a manner which is less complex than known solutions which are based on comparatively complex flight path computers and GPS positioning. This is achieved by transmitting a cell broadcast message from an access node of a wireless communications network, such as a Radio Base Station (RBS), a Base Transceiver Station (BTS) of a GSM network, a NodeB of a UMTS network, an eNodeB of an LTE network, or an Access Point (AP) of a WiFi/WLAN network, to the aerial vehicle. The cell broadcast message, which may be in the form of Short Message Service-Cell Broadcast (SMS-CB), LTE Broadcast, or WiFi multicast, is transmitted in response to detecting that the aerial vehicle has entered a pre-defined geographical region which is part of the coverage are of the wireless communications network. The geographical area may, e.g., be a cell or a sector associated with an access node of a cellular communications network, or a coverage region of a WiFi AP. Alternatively, the geographical area may be defined in terms of a geographic coordinate system and utilizing a Location Based Service (LBS) solution which is interworking with the wireless communications network. To this end, if the position of the aerial vehicle, as determined by a Mobile Positioning System (MPS) of the wireless communications network or the LBS solution, is within the pre-defined geographical region, transmission of a cell broadcast message by an access node which is in communication with the aerial vehicle is triggered.

The proposed solution leverages on existing MPS/LBS solutions, oftentimes known as geo-fencing, which enable operators of wireless communications networks to provide services to mobile terminals, and their users, which are based on users', or rather their mobile terminals', respective position. This is achieved by utilizing existing MPS/LBS solutions to trigger the transmission of a cell broadcast message when an aerial vehicle enters a pre-defined geographical region. By associating different geographical regions with instructions pertaining to the flight path of aerial vehicles entering, or leaving, a specific geographical region, it is possible to create areas into which aerial vehicles obeying such cell broadcast messages cannot enter, or areas into which such aerial vehicles are directed. It will be understood that embodiments of the invention rely on a common protocol for such cell broadcast messages, i.e., a protocol which is adapted not only by the wireless communications networks but also by compliant aerial vehicles. In this respect, it may be envisioned that UAVs and drones in the future are required, by law or other means of regulation, to comply with such a protocol to simplify guarding the airspace around airports, or the like.

Advantageously, rather than adjusting the exact flight path of each aerial vehicle by re-programming the flight path computer, a cell broadcast message is sent to the aerial vehicle when entering a pre-defined geographical region, in response to which the aerial vehicle adjusts its flight path in accordance with the cell broadcast message, irrespective of its pre-programmed flight path. By including an aerial vehicle type in the cell broadcast message, it may effectively be limited to a certain type or certain types of aerial vehicles.

According to an embodiment of the invention, the cell broadcast message comprises at least one, or a combination, of an instruction, a limitation, a restriction, a direction, a change of direction, a bearing, a change of bearing, an altitude, a change of altitude, an aerial vehicle type, and an aerial vehicle identity. By selecting appropriate content which is transmitted with cell broadcast messages, which content is associated with a certain geographical region, location-dependent limitations on the flight path of aerial vehicles can be realized. For instance, "unmanned" aerial vehicles may be prevented from entering a certain geographical region, or "emergency" aerial vehicles may be directed into a certain geographical region in case of an accident or a natural disaster.

According to an embodiment of the invention, the content of the cell broadcast message is dependent on configuration information associated with the pre-defined geographical area. This configuration information may be provided through an interface of the operator's MPS/LBS solution. For instance, an operator may assign configuration information pertaining to instructions, limitations, restrictions, directions or a change thereof, bearings or a change thereof, altitudes or a change thereof, aerial vehicle types, and aerial vehicle identities. Subsequently, cell broadcast messages with content based on corresponding configuration information are transmitted to aerial vehicles entering, or leaving, one of the pre-defined geographical regions.

Even though advantages of the invention have in some cases been described with reference to embodiments of the first and second aspect of the invention, corresponding reasoning applies to embodiments of other aspects of the invention.

Further objectives of, features of, and advantages with, the invention will become apparent when studying the following detailed disclosure, the drawings and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

The invention will now be described more fully herein after with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

Figure 1:
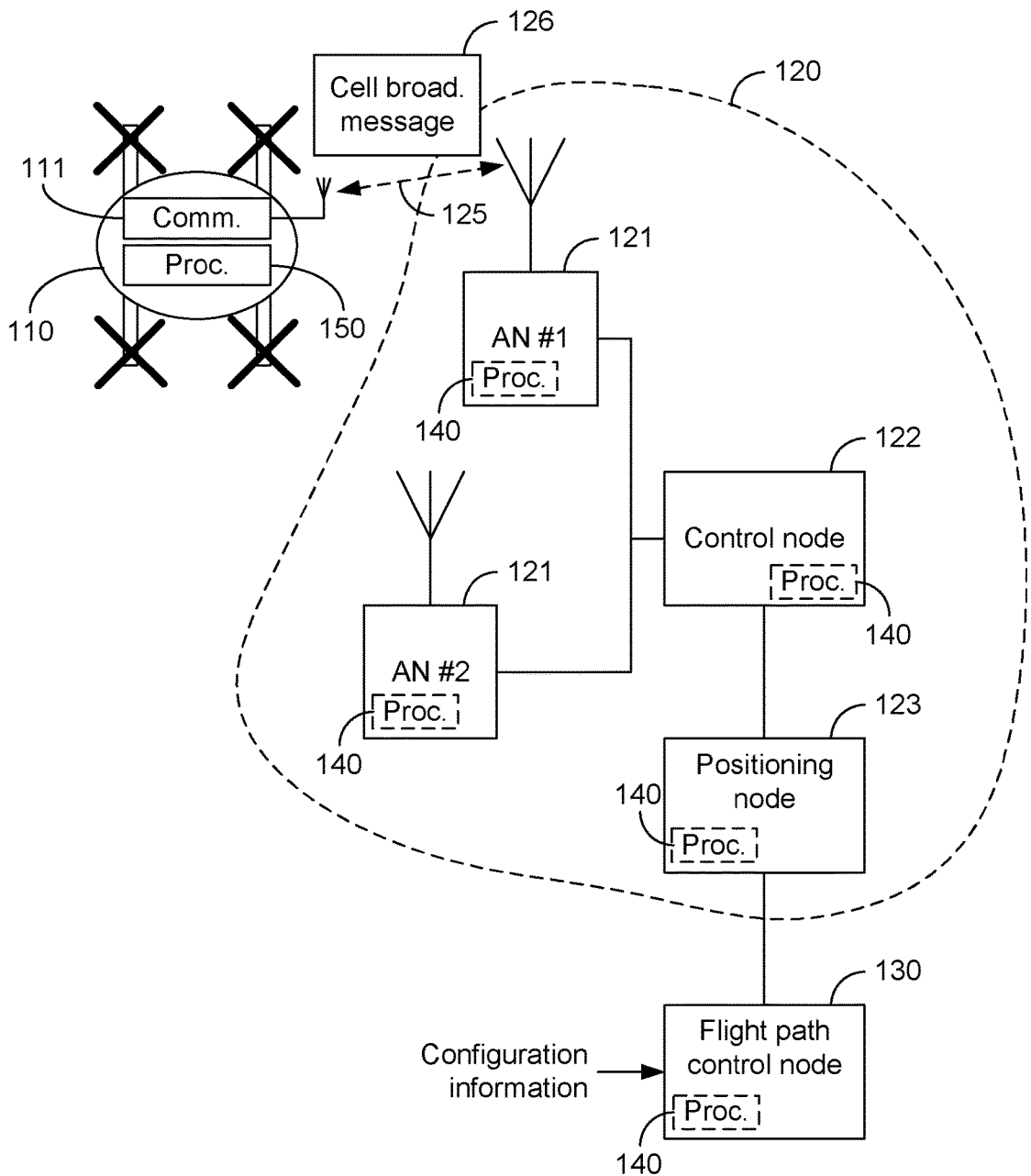
FIG. 1 shows an aerial vehicle and nodes of a wireless communications network, in accordance with embodiments of the invention.

In FIG. 1, an aerial vehicle 110 comprising a communications module 111 for communicating with a wireless communications network 120, and nodes 121-123 of wireless communications network 120, are illustrated, in accordance with embodiments of the invention. Aerial vehicle 110, in FIG. 1 illustrated as a quadcopter, may be any type of UAV, drone, aircraft, or helicopter. Wireless communications network 120 may, e.g., be a cellular communications network such as a GSM network, a UMTS network, or an LTE network, or a WiFi network. For the purpose of elucidating the invention, wireless communications network 120 is in FIG. 1 illustrated as comprising specific nodes, in particular two access nodes 121 (denoted AN #1 and AN #2), a control node 122, and a positioning node 123. Depending on the type of wireless communications network 120, access nodes 121 may be any one of an RBS, a BTS, a NodeB, an eNodeB, and a WiFi AP. Correspondingly, control node 122 may be any one of a Base Station Controller (BSC), a Radio Network Controller (RNC), a Mobility Management Entity (MME), and a WiFi controller. Positioning node 123 is a node of an MPS which is deployed for ascertaining the position or location of a mobile node, such as a mobile terminal, a Mobile Station (MS), a User Equipment (UE), and a WiFi terminal, communicating with wireless communications network 120.

In the context of the present invention, communication module 111 comprised in aerial vehicle 110 takes the role of the mobile node and is operative to effect communications in accordance with at least one of a GSM, UMTS, LTE, and WiFi, standard. Localization or positioning by positioning node 123 may occur either via multilateration of radio signals between (several) access nodes 121 of wireless communications network 120 and the mobile node, or simply via GPS. To locate a mobile node using multilateration of radio signals, it must emit at least the roaming signal to contact the next nearby antenna tower, i.e., an access node, but the process does not require an active call.

Figure 2:
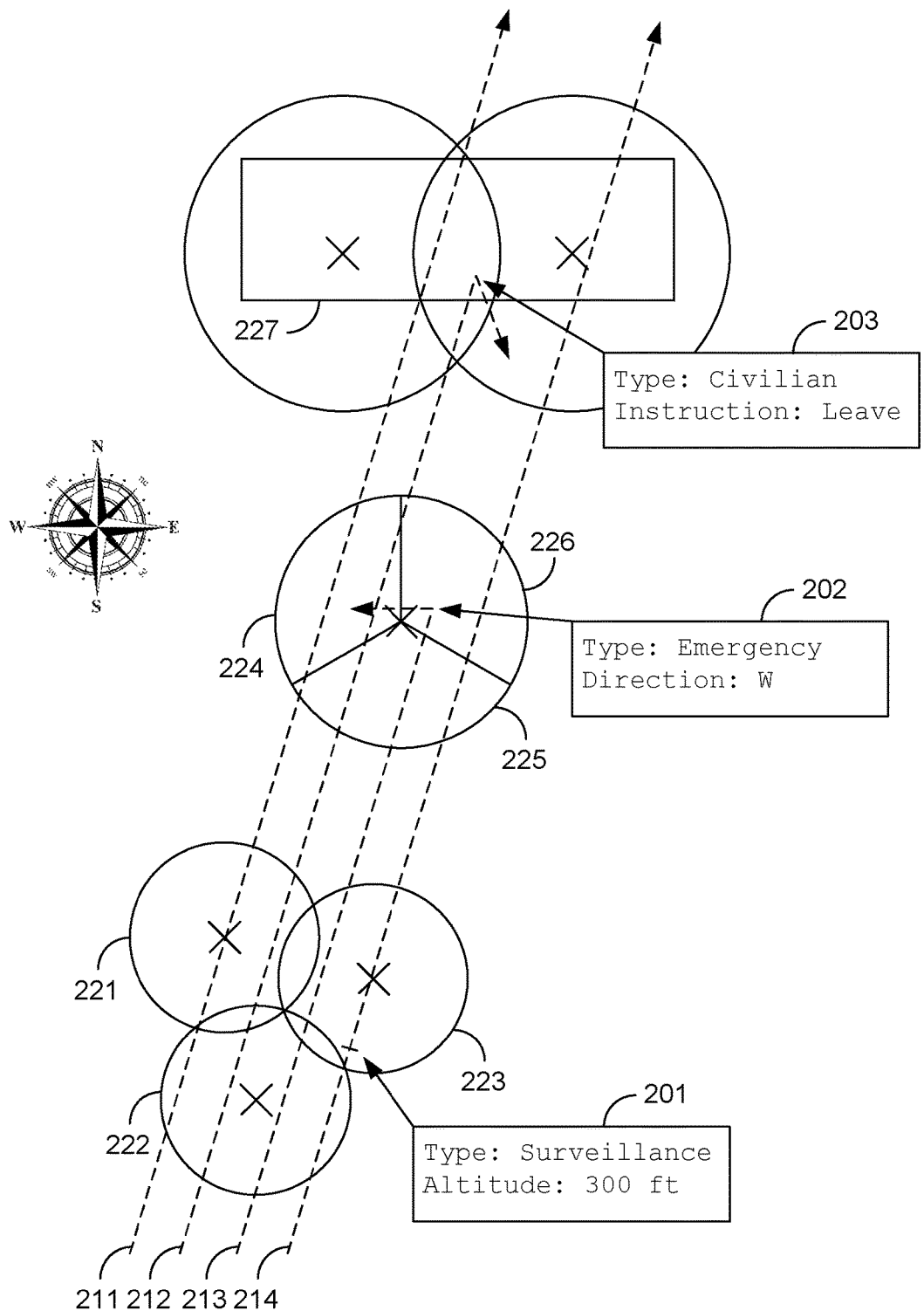
FIG. 2 illustrates controlling the flight path of an aerial vehicle based on cell broadcast messages transmitted by a node of a wireless communications network, in accordance with embodiments of the invention.

Further with reference to FIG. 1, one of the nodes 121-123, or an interworking combination of nodes 121-123, of wireless communications network 120 is operative to detect that aerial vehicle 110 enters, or leaves, a pre-defined geographical region 221-227 within a coverage area of wireless communications network 120, as is illustrated in FIG. 2. Depending on the character of the pre-defined geographical region, this may be accomplished in a number of ways. For instance, the pre-defined geographical region 221-227 may be a cell 221-223 or a sector 224-226 of an access node of a cellular communications network 120, such as access nodes 121. Alternatively, the pre-defined geographical regions may be coverage areas of WiFi APs. In FIG. 2, access nodes are illustrated by crosses located in the center of a respective circular coverage area, indicating the spatial extension of the respective cells, or coverage areas, around each of the access nodes. If the pre-defined geographical region corresponds to a cell 221-223 or a sector 224-226 of wireless communications network 120, an attempt of communications module 111 to establish communications with one of access nodes 121, or the success thereof, may be used as an indication that aerial vehicle 110 enters the geographical region which is associated with a cell 221-223 or a sector 224-226, respectively, of the corresponding access node. The pre-defined geographical region may alternatively be defined using an existing LBS or MPS solution. To this end, such solutions allow operators to define spatial triggers and to associate these with actions which are initiated in response to a spatial trigger. In this case, the geographical region may be defined in terms of a geographic coordinate system, i.e., by specifying at least three latitude-longitude coordinate pairs for defining a geographical region of triangular or more complex shape. This is illustrated in FIG. 2, in which geographical area 227 exemplifies a rectangular region which extends over the coverage area, i.e., cells, of two access nodes.

The one or more nodes 121-123 of wireless communications network 120 are further operative to transmit a cell broadcast message 126 to aerial vehicle 110, utilizing a wireless link 125 between access node 121 and communications module 111. The transmission of cell broadcast message 126 is triggered by aerial vehicle 110 entering, or leaving, one of the pre-defined geographical areas 221-227. Cell broadcast message 126 may, e.g., be an SMS-CB message, an LTE Broadcast message, or a WiFi multicast message.

Cell broadcast message 126 comprises at least one of an instruction, a limitation, a restriction, a direction or a change thereof, a bearing or a change thereof, an altitude or a change thereof, an aerial vehicle type, and an aerial vehicle identity, and may optionally comprise a combination thereof. This content of cell broadcast message is used for controlling or influencing the flight path of aerial vehicle 110. The flight path of aerial vehicle 110, e.g., its original or intended flight path, is typically pre-programmed before lift-off, but may optionally be modified or updated during flight. Aerial vehicle 110 may alternatively be under control of an operator which remotely controls the flight path of aerial vehicle 110.

More specifically, cell broadcast message 126 may comprise at least one, or a combination of, the following:

An instruction to aerial vehicle 110 to modify its flight path, to continue its flight path, to change its flight path, to abort its flight path, or the like.

A limitation or a restriction to prevent aerial vehicle 110 from entering or leaving a certain pre-defined geographical region A direction or bearing, or a change of direction or bearing, of aerial vehicle 110.

An altitude, or a change of altitude, of aerial vehicle 110.

A type of aerial vehicle to which the content of cell broadcast message 126 is limited. For instance, the content of cell broadcast message 126 may be limited to emergency drones carrying medical equipment in case of an accident, directing such drones into the geographical region where the accident occurred. Different types of aerial vehicles may be defined, e.g., "emergency", "civilian", "UAV09", "surveillance", or the like. Advantageously, the type of an aerial vehicle characterizes its properties, specifications, equipment it carries, and/or its intended use. Aerial vehicle types may, e.g., be defined by a regulatory body.

An identity of the aerial vehicle to which the content of cell broadcast message 126 is limited. For instance, this may be used if a remote operator has lost control of a certain drone, to redirect that drone to a landing position. An aerial vehicle identity may, e.g., be an identifier of a Subscriber Identity Module (SIM) comprised in communications module 111, as an International Mobile Subscriber Identity (IMSI), an International Mobile Station Equipment Identity (IMEI) associated with communications module 111, a Medium Access Control (MAC) address associated with communications module 111, or any other identifier associated with aerial vehicle 110 and/or communications module 111.

The content of cell broadcast message 126 is preferably dependent on configuration information associated with one or more pre-defined geographical regions. Thereby, it is possible to tailor the flight paths of aerial vehicles, e.g., to prevent certain types of aerial vehicles from entering a specific geographical region, or directing a type of aerial vehicle into a specific geographical region.

It will be appreciated that the functionality described hereinbefore may be implemented in a single node 121-123 of wireless communications network or a combination thereof. Optionally, such functionality, or parts thereof, may also be implemented in a node separate from wireless communications network 120, such as flight path control node 130, which optionally is interworking with nodes 121-123. To this end, flight path control node 130 may, e.g., be operated by an operator of wireless communications network 120 or independently thereof, e.g., by a regulatory authority or air traffic control. Flight path control node 130 may be utilized for defining geographical regions 221-227 and providing configuration information which is associated with geographical regions, based on which configuration information the content of cell broadcast messages which are sent to aerial vehicles entering, or leaving, geographical regions 221-227, is determined. The functionality described herein is preferably implemented in a processing means 140 comprised in one or more of nodes 121-123 and 130, as is described further below with reference to FIG. 4.

Further with reference to FIG. 1, aerial vehicle 110 is operative to receive cell broadcast message 126 from access node 121 of wireless communications network 120, and in response thereto correct its flight path based on the content of cell broadcast message 126, as is elucidated in more detail in the following. The functionality described herein is preferably implemented in a processing means 150 comprised in aerial vehicle 110, as is described further below with reference to FIG. 3.

In FIG. 2, controlling the flight path of aerial vehicles based on cell broadcast messages in accordance with embodiments of the invention is illustrated by means of three exemplifying cell broadcast messages 201-203 and four exemplifying flight paths 211-214. Each of flight paths 211-214 in FIG. 2 illustrates a possible flight path of an embodiment of aerial vehicle 110 described with reference to FIG. 1, and how the flight path is effected by cell broadcast messages 201-203. For the sake of simplicity, cell broadcast messages 201-203 are illustrated as comprising two information elements, but it will be appreciated that embodiments of the invention are not limited to cell broadcast messages comprising two information elements.

Cell broadcast message 201 is transmitted to an aerial vehicle which enters the geographical region corresponding to that of cell 223 and is illustrated as comprising a first information element "Type" and a second information element "Altitude". The aerial vehicle following flight path 214 is classified as being of type "Surveillance" and corrects its flight path 214 in response to receiving cell broadcast message 201 by adjusting its altitude to 300 ft, in accordance with the second information element carried in cell broadcast message 201. The aerial vehicles following the other flight paths 211-213 are not affected, either for the reason that the corresponding aerial vehicles do not enter the geographical region defined by cell 223 (flight paths 211 and 212), or because they are not of type "Surveillance" (flight path 213).

Cell broadcast message 202 is transmitted to an aerial vehicle which enters the geographical region corresponding to sector 226 and is illustrated as comprising a first information element "Type" and a second information element "Direction". The aerial vehicle following flight path 213 is classified as being of type "Emergency" and corrects its flight path 213 in response to receiving cell broadcast message 202 by adjusting its direction to West (W). The aerial vehicles following the other flight paths 211, 212, and 214, are not affected, either for the reason that the corresponding aerial vehicles do not enter the geographical region defined by sector 226 (flight paths 211 and 212), or because they are not of type "Emergency" (flight path 214). A typical uses case for such a scenario may, e.g., be to direct aerial vehicles carrying medical equipment or emergency personnel to a region west of sector 226.

Cell broadcast message 203 is transmitted to an aerial vehicle which enters geographical region 227, which is defined by utilizing an LBS or MPS solution, i.e., in terms of geographical coordinates. Whereas geographical region 227 is illustrated as being rectangular in FIG. 2, requiring at least four geographical coordinates for its definition, it will be appreciated that embodiments of the invention may be based on pre-defined geographical regions of any shape other than rectangular. Cell broadcast message 203 is illustrated as comprising a first information element "Type" and a second information element "Instruction". The aerial vehicle following flight path 212 is classified as being "Civilian" and corrects its flight path 212 in response to receiving cell broadcast message 203 by turning, so as to leave geographical region 227. A typical use cases for cell broadcast message 203 may, e.g., be a military airfield, around which geographical region 227 is defined as a virtual fence to prevent non-military aerial vehicles from entering. Such embodiments of the invention are particularly advantageous if aerial vehicles, in particular UAVs, are required (by a regulatory body) to obey the type of cell broadcast messages described herein, and correct their flight path accordingly.

With reference to FIG. 2, the aerial vehicle following flight path 211 is not correcting its flight path 211 for the reason that it has not entered a geographical region which triggers transmission of a cell broadcast message, such as cell 223 which is associated with cell broadcast message 201 and sector 226 which is associated with cell broadcast message 202, or because it is not of type "Civilian". That is, even though cell broadcast message 203 is transmitted to the aerial vehicle following flight path 211 when entering geographical region 227, the aerial vehicles does not correct its flight path. The aerial vehicle may, e.g., be a military aerial vehicle which is not restricted from entering the military airfield protected by geographical region 227.

In the following, embodiments of processing means 150, comprised in aerial vehicle 110, are described with reference to FIG. 3.

A first embodiment 310 of processing means 150 may comprise a processing unit 312, such as a general purpose processor, and a computer-readable storage medium 313, such as a Random Access Memory (RAM), a Flash memory, or the like. In addition, processing means 310 comprises one or more interfaces 311 ('I/O' in FIG. 3) for controlling and/or receiving information, such as cell broadcast message 126, from communications module 111, and for controlling one or more actuators which are arranged for controlling the flight path of aerial vehicle 110 by adjusting its rudder, thrust, and the like. Memory 313 contains computer-executable instructions 314, i.e., a computer program, for causing aerial vehicle 110 to perform in accordance with embodiments of the invention as described herein, when computer-executable instructions 314 are executed on processing unit 312.

Figure 3:
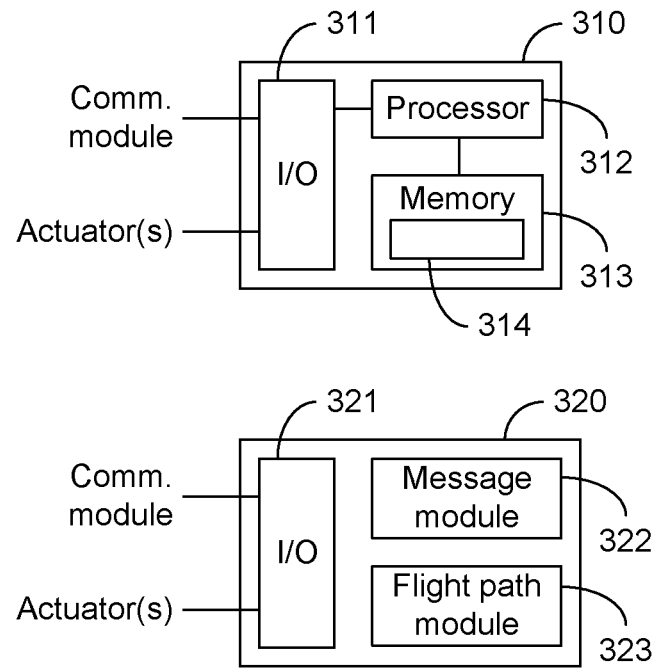
FIG. 3 shows embodiments of the processing means comprised in the aerial vehicle, in accordance with embodiments of the invention.

An alternative embodiment 320 of processing means 150 is also shown in FIG. 3. Similar to processing means 310, processing means 320 comprises one or more interfaces 321 ('I/O' in FIG. 3) for controlling and/or receiving information, such as cell broadcast message 126, from communications module 111, and for controlling one or more actuators which are arranged for controlling the flight path of aerial vehicle 110 by adjusting its rudder, thrust, and the like. Processing means 320 further comprises a message module 322 and a flight path module 323 which are operative to perform in accordance with embodiments of the invention as described herein. In particular, message module 322 is operative to receive a cell broadcast message from an access node of the wireless communications network 120, via communications module 111, and flight path module 323 is operative to, in response thereto, correct the flight path of aerial vehicle 110 based on the received cell broadcast message.

In the following, embodiments of processing means 140, comprised in one or more of nodes 121-123 of wireless communications network 120, are described with reference to FIG. 4.

A first embodiment 410 of processing means 140 may comprise a processing unit 412, such as a general purpose processor, and a computer-readable storage medium 413, such as a Random Access Memory (RAM), a Flash memory, or the like. In addition, processing means 410 comprises one or more interfaces 411 ('I/O' in FIG. 4) for controlling the node in which it is comprised, in particular a communications module which is operative to transmit a cell broadcast message and optionally receive location information from another node of wireless communications network 120, or a trigger from flight path control node 130 to transmit a cell broadcast message. Memory 413 contains computer-executable instructions 414, i.e., a computer program, for causing one or more of nodes 121-123 to perform in accordance with embodiments of the invention as described herein, when computer-executable instructions 414 are executed on processing unit 412.

Figure 4:
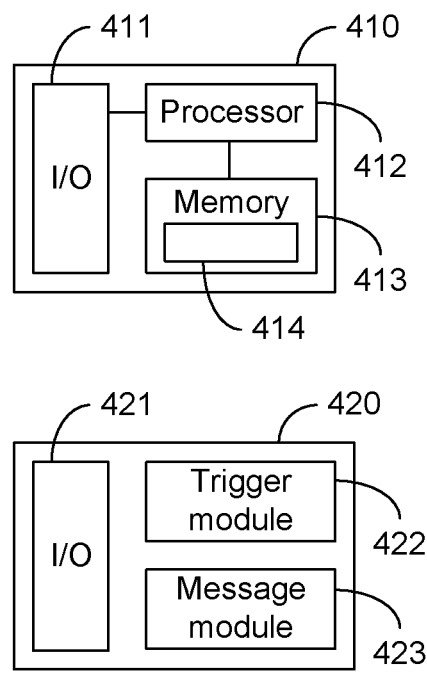
FIG. 4 shows embodiments of the processing means comprised in the node of the wireless communications network, in accordance with embodiments of the invention.

An alternative embodiment 420 of processing means 140 is also shown in FIG. 4. Similar to processing means 410, processing means 420 comprises one or more interfaces 421 ('I/O' in FIG. 4) for controlling the node in which it is comprised, in particular a communications module which is operative to transmit a cell broadcast message and optionally receive location information from another node of wireless communications network 120, or a trigger from flight path control node 130 to transmit a cell broadcast message. Processing means 420 further comprises a trigger module 422 and a message module 423 which are operative to perform in accordance with embodiments of the invention as described herein. In particular, trigger module 422 is operative to detect that an aerial vehicle enters a pre-defined geographical region within a coverage area of the wireless communications network, and message module 423 is operative to transmit a cell broadcast message to the aerial vehicle. Alternatively, trigger module 422 may be operative to receive a trigger from flight path control node 130 to transmit a cell broadcast message.

Interface(s) 311, 321, 411, and 421, and modules 322, 323, 422, and 423, as well as any additional modules comprised in processing means 320 or 420, may be implemented by any kind of electronic circuitry, e.g., any one, or a combination of, analogue electronic circuitry, digital electronic circuitry, and processing means executing a suitable computer program.

Figure 5:
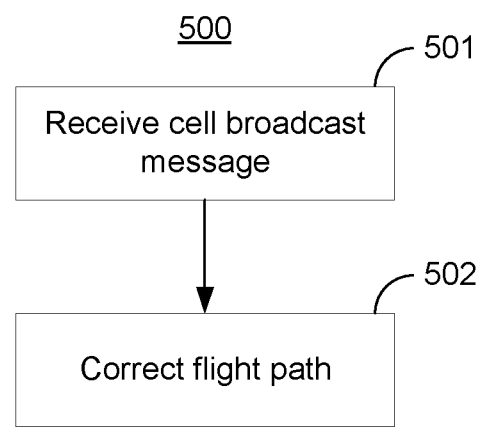
FIG. 5 shows a flow chart illustrating a method of an aerial vehicle, in accordance with embodiments of the invention.

In the following, embodiments 500 of the method of an aerial vehicle comprising a communications module for communicating with a wireless communications network are described with reference to FIG. 5. Method 500 comprises receiving 501 a cell broadcast message from an access node of the wireless communications network, and, in response thereto, correcting 502 the flight path of the aerial vehicle based on the received cell broadcast message. Preferably, the cell broadcast message comprises at least one, or a combination, of an instruction, a limitation, a restriction, a direction or a change thereof, a bearing or a change thereof, an altitude or a change thereof, an aerial vehicle type, and an aerial vehicle identity. It will be appreciated that method 500 may comprise additional, or modified, steps in accordance with what is described throughout this disclosure. Method 500 may be performed by any type of aerial vehicle, e.g., a UAV, a drone, an aircraft, or a helicopter. An embodiment of method 500 may be implemented as software, such as computer program 314, to be executed by a processing unit comprised in the aerial vehicle, whereby the aerial vehicle is operative to perform in accordance with embodiments of the invention described herein.

Figure 6:
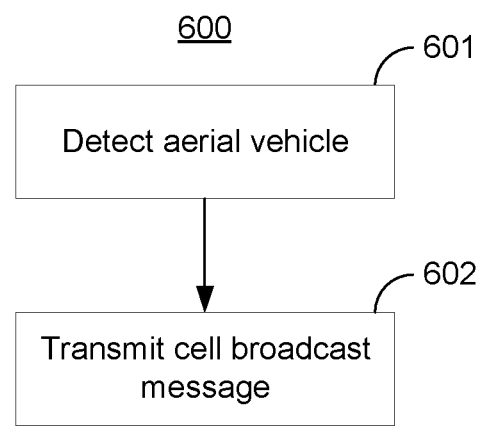
FIG. 6 shows a flow chart illustrating a method of a node of a wireless communications network, in accordance with embodiments of the invention.

In the following, embodiments of the method 600 of a node of a wireless communications network are described with reference to FIG. 6. The method 600 comprises detecting that an aerial vehicle enters a pre-defined geographical region within a coverage area of the wireless communications network, and, in response thereto, transmitting 602 a cell broadcast message to the aerial vehicle. Preferably, the cell broadcast message comprises at least one, or a combination, of an instruction, a limitation, a restriction, a direction or a change thereof, a bearing or a change thereof, an altitude or a change thereof, an aerial vehicle type, and an aerial vehicle identity. Optionally, the content of the cell broadcast message may be dependent on configuration information associated with the pre-defined geographical region. It will be appreciated that method 600 may comprise additional, or modified, steps in accordance with what is described throughout this disclosure. Method 600 may be performed by any node of the wireless communications network, or a combination of interworking nodes. An embodiment of method 600 may be implemented as software, such as computer program 414, to be executed by a processing unit comprised in the node, or interworking processing units in respective nodes, whereby the node or nodes is/are operative to perform in accordance with embodiments of the invention described herein.

The person skilled in the art realizes that the invention by no means is limited to the embodiments described above. On the contrary, many modifications and variations are possible within the scope of the appended claims.

The invention claimed is:

1. An aerial vehicle, the aerial vehicle comprising:
memory; and
processing circuitry coupled to the memory, wherein the aerial vehicle is configured to:
receive a cell broadcast message, wherein an access node of a wireless communications network transmitted the cell broadcast message in response to detecting that the aerial vehicle has entered a pre-defined geographical region and further wherein the cell broadcast message comprises aerial vehicle identification information:
determine, based on information included in the cell broadcast message, whether or not to correct a flight path of the aerial vehicle; and
adjust the flight path as a result of determining, based on the information included in the cell broadcast message, that the aerial vehicle should correct the fight path, wherein
the aerial vehicle is configured to determine whether or not to correct the flight path of the aerial vehicle based on the information included in the cell broadcast message by performing a process that includes determining, based on the aerial vehicle identification information included in the cell broadcast message, whether the message is intended for the aerial vehicle,
the aerial vehicle identification information comprises at least one of: i) an aerial vehicle identifier that identifies a single aerial vehicle or ii) an aerial vehicle group identifier that identifies a group of aerial vehicles, and the access node is a base station of a cellular network.

2. The aerial vehicle according to claim 1, wherein the cell broadcast message comprises any one or a combination of an instruction, a limitation, a restriction, a direction or a change thereof, a bearing or a change thereof, an altitude or a change thereof, an aerial vehicle type, or an aerial vehicle identity.

3. The aerial vehicle according to claim 1, wherein
the wireless communications network is one of a Global System for Mobile Communications network, a Universal Mobile Telecommunications System network, a Long Term Evolution network, and a WiFi network, and
the aerial vehicle is one of an unmanned aerial vehicle, a drone, an aircraft, and a helicopter.

4. The aerial vehicle according to claim 1, wherein the aerial vehicle identification information comprises an aerial vehicle identifier that identifies a single aerial vehicle.

5. The aerial vehicle according to claim 1, wherein the cell broadcast message further comprises:
an instruction to modify a flight path of the aerial vehicle, and/or
information about a specific altitude for the aerial vehicle or information about a specific change of the aerial vehicle's altitude.

6. The aerial vehicle according to claim 1, wherein the aerial vehicle group identifier is a type identifier identifying a type of aerial vehicles.

7. A node of a wireless communications network, the node comprising:
memory; and
processing circuitry, wherein the node is configured to:
detect that an aerial vehicle has entered a pre-defined geographical region within a coverage area of the wireless communications network; and
in response to detecting that an aerial vehicle has entered the pre-defined geographical region, trigger a base station of a cellular network to transmit a cell broadcast message comprising aerial vehicle identification information, wherein
the aerial vehicle identification information comprises at least one of: i) an aerial vehicle identifier that identifies a single aerial vehicle or ii) an aerial vehicle group identifier that identifies a group of aerial vehicles, wherein
the node is an access node or a control node of the wireless communications network, and the cell broadcast message is configured to trigger the aerial vehicle to determine whether or not to correct a flight path of the aerial vehicle based on information included in the cell broadcast message and to adjust the flight path based on the determination.

8. The node according to claim 7, wherein the pre-defined geographical region is one of a cell and a sector of a geographical region associated with an access node of the wireless communications network.

9. The node according to claim 7, wherein the cell broadcast message comprises any one or a combination of an instruction, a limitation, a restriction, a direction or a change thereof, a bearing or a change thereof, an altitude or a change thereof, an aerial vehicle type, or an aerial vehicle identity.

10. The node according to claim 8, wherein the content of the cell broadcast message is dependent on configuration information associated with the pre-defined geographical region.

11. The node according to claim 7, wherein
the wireless communications network is one of a Global System for Mobile Communications network, a Universal Mobile Telecommunications System network, a Long Term Evolution network, and a WiFi network, and
the aerial vehicle is one of an unmanned aerial vehicle, a drone, an aircraft, and a helicopter.

12. A method performed by an aerial vehicle, the method comprising:
receiving a cell broadcast message, wherein an access node of a wireless communications network transmitted the cell broadcast message in response to detecting that the aerial vehicle has entered a pre-defined geographical region and further wherein the cell broadcast message comprises aerial vehicle identification information;
determining, based on information included in the cell broadcast message, that the aerial vehicle should correct a flight path of the aerial vehicle; and
adjusting the flight path as a result of determining, based on the information included in the cell broadcast message, that the aerial vehicle should correct the flight path, wherein
determining whether or not to correct the flight path of the aerial vehicle based on the information included in the cell broadcast message comprises determining, based on the aerial vehicle identification information included in the cell broadcast message, whether the message is intended for the aerial vehicle,
the aerial vehicle identification information comprises at least one of: i) an aerial vehicle identifier that identifies a single aerial vehicle or ii) an aerial vehicle group identifier that identifies a group of aerial vehicles, and
the access node is a base station of a cellular network.

13. The method according to claim 12, wherein the cell broadcast message comprises any one or a combination of an instruction, a limitation, a restriction, a direction or a change thereof, a bearing or a change thereof, an altitude or a change thereof, an aerial vehicle type, or an aerial vehicle identity.

14. The method according to claim 12, wherein
the wireless communications network is one of a Global System for Mobile Communications network, a Universal Mobile Telecommunications System network, a Long Term Evolution network, and a WiFi network, and
the aerial vehicle is one of an unmanned aerial vehicle, a drone, an aircraft, and a helicopter.

15. A method performed in a wireless communications network, the method comprising:
a node detecting that an aerial vehicle enters a pre-defined geographical region within a coverage area of the wireless communications network; and
in response to detecting that the aerial vehicle has entered the pre-defined geographical region, the node triggering a base station of a cellular network to transmit a cell broadcast message comprising aerial vehicle identification information, wherein
the aerial vehicle identification information comprises at least one of: i) an aerial vehicle identifier that identifies a single aerial vehicle or ii) an aerial vehicle group identifier that identifies a group of aerial vehicles, wherein the node is an access node or a control node of the wireless communications network, and the cell broadcast message is configured to trigger the aerial vehicle to determine whether or not to correct a flight path of the aerial vehicle based on information included in the cell broadcast message and to adjust the flight path based on the determination.

16. The method according to claim 15, wherein the pre-defined geographical region is one of a cell and a sector of a geographical region associated with an access node of the wireless communications network.

17. The method according to claim 15, wherein the cell broadcast message comprises any one or a combination of an instruction, a limitation, a restriction, a direction or a change thereof, a bearing or a change thereof, an altitude or a change thereof, an aerial vehicle type, or an aerial vehicle identity.

18. The method according to claim 15, wherein the content of the cell broadcast message is dependent on configuration information associated with the pre-defined geographical region.

19. The method according to claim 15, wherein the wireless communications network is one of a Global System for Mobile Communications network, a Universal Mobile Telecommunications System network, a Long Term Evolution network, and a WiFi network, and the aerial vehicle is one of an unmanned aerial vehicle, a drone, an aircraft, and a helicopter.

20. A computer program product comprising a non-transitory computer-readable storage medium storing a computer program comprising computer-executable instructions for causing a device to perform the method of claim 12.

* * * * *